Figure 1:
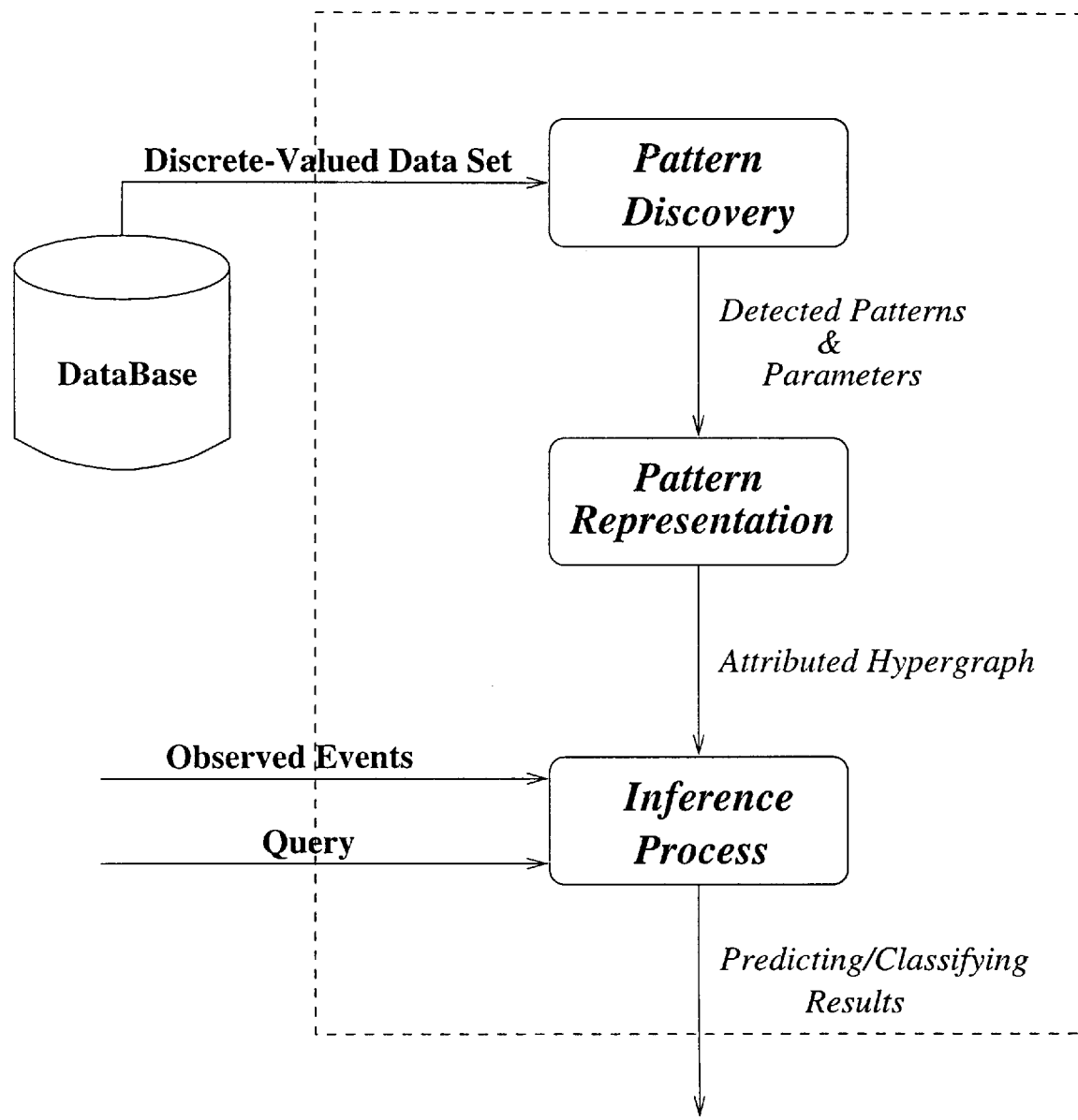

United States Patent [19]
Wong et al.

[11] Patent Number: 5,809,499
[45] Date of Patent: Sep. 15, 1998

[54] COMPUTATIONAL METHOD FOR DISCOVERING PATTERNS IN DATA SETS

[75] Inventors: Andrew K. C. Wong, Waterloo; Tom Tak Kin Chau, Toronto; Yang Wang, Waterloo, all of Canada

[73] Assignee: Pattern Discovery Software Systems, Ltd., Waterloo, Canada

[21] Appl. No.: 733,576

[22] Filed: Oct. 18, 1996

Related U.S. Application Data

[60] Provisional application No. 60/005,778, Oct. 20, 1995.
[51] Int. Cl.$^6$ ..................................... G06F 17/30
[52] U.S. Cl. .................................... 707/6; 707/3; 395/12; 395/705; 704/1; 704/200; 345/156; 345/326; 345/339; 178/18
[58] Field of Search ........................... 707/6, 3; 395/207, 395/209, 676, 751, 761, 705, 12; 704/1, 200; 345/156, 326, 339; 178/18

[56] References Cited

PUBLICATIONS

Smyth et al., "An information theoretic approach to rule induction from database," IEEE, pp. 301–316, Aug. 1992.
Langley et al., "Approaches to machine learning," IEEE, pp. 306–316, Sep. 1984.
Michalski et al., "Automated construction of classifications: conceptual clustering versus numerical taxonomy," IEEE, pp. 396–410, Jul. 1983.
Michalski et al., "Knowledge acquisition by encoding expert rules versus computer induction from examples: a case study involving soybean pathology," IEEE, pp. 63–87, Jun. 1979.
Chan et al., "APACS: A system for Automatited pattern analysis and classification," computational Intelligence, vol. 6, No. 3, pp. 119–131, May, 1989.
D.H. Fischer, "Conceptual clustering, learning from examples, and inference", proceedings of the 4th Intenational workshop on machine learning, pp. 38–49, Jan. 1987.
Langey et al., "Conceptual clustering as discrimination learning", Proceedings of the Fifth Biennial Conference of the Canadian Society for computational Studies of Intelligence, pp. 95–98, Jan. 1984.
Fisher et al., "An empirical comparison of ID3 and Back–propagation", Proceedings of the 11th International joint conference on artificial Intelligence, vol. 1, pp. 788–793, Aug. 1989.
S.J. Harberman, "The analysis of residuals in cross–classified tables", Biometrics, vol.29, No. 1–4, pp. 205–220, Jan. 1973.
Shelby J. Haberman "The Analysis of reiduals in cross–classified tables", Biometrics, vol. 29, No. 1–4, pp. 205–220, Mar. 1973.
Douglas H. Fisher, "Knowledge acquisition via Incremental conceptual clustering", Machine Learning, vol.2, No.2, pp. 139–172, May 1987.

(List continued on next page.)

*Primary Examiner*—Thomas G. Black
*Assistant Examiner*—Jean M. Corrielus
*Attorney, Agent, or Firm*—Lynn C. Schumacher; Hill & Schumacher; Dowell & Dowell, P.C.

[57] ABSTRACT

Automatic discovery of qualitative and quantitative patterns inherent in data sets is accomplished by use of a unified framework which employs adjusted residual analysis in statistics to test the significance of the pattern candidates generated from data sets. This framework consists of a search engine for different order patterns, a mechanism to avoid exhaustive search by eliminating impossible pattern candidates, an attributed hypergraph (AHG) based knowledge representation language and an inference engine which measures the weight of evidence of each pattern for classification and prediction. If a pattern candidate passes the statistical significance test of adjusted residual, it is regarded as a pattern and represented by an attributed hyperedge in AHG. In the task of classification and/or prediction, the weights of evidence are calculated and compared to draw the conclusion.

4 Claims, 1 Drawing Sheet

PUBLICATIONS

J.R. Quinlan, "Induction of Decision Trees", Machine Learning, V.1, No.1, pp. 81–106, Jun. 1986.

D.H. Fisher, "A Hierarchical conceptual Clustering Algorithm", Technical report, Dept of information and computer science, University of California, Irvine, Mar. 1984.

C. Berge, "Hypergraphes, combinatoires des ensembles finis", Annales de L'IHP—Analyse Non Lineaire, Jan. 1987.

Holsheimer et al., "Data mining the search for knowledge in databases", Computer Science/Department of Algorithmics and Architecture, Jan. 1994.

COMPUTATIONAL METHOD FOR DISCOVERING PATTERNS IN DATA SETS

CROSS REFERENCE TO RELATED APPLICATION

This application relates to Provisional Application, Ser. No. 60/005,778, filed on Oct. 20, 1995, entitled METHOD OF PATTERN COVERY IN DATA SETS.

1. FIELD OF THE INVENTION

The present invention relates to a new method of discovering qualitative and quantitative patterns, and, more particularly, to an improved framework of statistical pattern discovery.

2. BACKGROUND OF THE INVENTION

One of the basic tasks of machine learning and data analysis is to automatically uncover the qualitative and quantitative patterns in a data set. When a large database is given, to discover the inherent patterns and regularities becomes a challenging task especially when no domain knowledge is available or when the domain knowledge is too weak. Because of the size of the database, it is almost impossible for a decision maker to manually abstract from it the useful patterns. Hence it is desirable to have automatic pattern discovery tools to support various types of decision making tasks.

Consider that we have a set D of M observations or samples obtained from a database. Then each observation is described by N attributes. Thus, for any distinct attribute, there is a domain of possible values which can be numeric, boolean and/or symbolic. If the order of the instances in the database is important, the instances forms a sequence. Otherwise, the instances are only a collections of occurrences.

The purpose of pattern discovery, be it referred to as conceptual clustering [14] or rule induction [17], is to find the relations among the attributes and/or among their values. We seek to find those events whose occurrences are significantly different from those based on a "random" model. Thus, the co-occurrence of events detected may reflect the nature of the data set and provide useful information for future inferences and reasoning.

Several open problems in machine learning and automatic knowledge acquisition are considered when developing this invention. The first is in regard to learning in the presence of uncertainty. Early machine learning systems were developed in the noise-free or deterministic environment [11]. The training data set is assumed to be entirely correct. However, for a real-world database, this assumption hardly stands. The instances in the database may include attributes based on measurement or subjective judgments, both of which may give rise to errors in the value of attributes [10]. Our method does not assume that the data set are exhaustive and/or noise-free. It is an inherently probabilistic method using standard statistical hypothesis testing to select patterns from the candidates. It is also able to detect deterministic patterns governed by first order logic. In view of this, this method is a more general approach to pattern discovery than most of its contemporaries.

The second problem concerns the detection of polythetic patterns without relying on exhaustive search. There are efficient systems available for detecting only the monothetic patterns such as [3]. There are also systems for detecting polythetic patterns but with them exhaustive search is required [7]. Many well-known systems, including the original version of ID3 [16], DISCON [12] and RUMMAGE [4], are monothetic in that they detect only relationships between two attributes. Some other systems, such as AQ [13], Cluster/2 [14]. COBWEB [5], ITRULE [17] and some Bayesian-based systems, are polythetic in that they consider the conjunction of more than two attributes. Due to the nature of most real world data, monothetic relations are inadequate to describe many problem domains. For robust learning, polythetic assessments of feature combinations (or higher order relationship detection) are imperative. Newer versions of ID3 use various pre- and post-pruning techniques to achieve polythetic learning. But when the number of attributes are large, learning time becomes a serious problem. Cluster/2 is also computationally expensive even with its Hierarchy-building Module. Another drawback of such a deterministic system is that it would not be able to give correct clustering results in the presence of noise. An incremental algorithm, COBWEB, employs optimistic learning, by which the concept tree generated might be very large and post-pruning techniques have to be applied. ITRULE generates rules directly from data sets. Since the measurement it uses cannot be summed, it is hard to quantitatively evaluate the evidence of a set of observations in the inference process. This system cannot incorporate negative information in the inference process. Our method attempts to resolve these problems by directly constructing polythetic concepts without pre- or post-pruning steps. It is able to speed up the process by screening out non-informative lower-order pattern candidates from high order consideration using statistics-based heuristics in the discovering process. Both positive and negative patterns will be discovered and applied in the reasoning stage.

Up to our knowledge, none of an existing system can detect both time-independent and time-dependent polythetic patterns in the presence of uncertainty. PIT [2] can detect both types of patterns, but the patterns it detects are only monothetic. There is a need to design a system which is capable of formulate pattern discovery into one scheme.

The last problem concerns the representation of the detected patterns. To use the detected patterns for further inferencing and reasoning, it is essential to represent them in appropriate explicit schemas. Traditionally, if-then rules and graphs, including networks and trees, are the most popular ones. However, when dealing with multilevel and multiple order patterns, traditional representations would have shortcomings due to the non-exhaustive and unpredictable hierarchical nature of the inherent patterns. Here, we use Attributed HyperGraph (AHG) as the representation of the detected patterns. The AHG is a structure that is general enough to encode information at many levels of abstraction yet simple enough to quantify the information content of its organized structure. It is able to encode both the qualitative and the quantitative characteristics and relations inherent in the data set.

3. OBJECTS

The principal object of the invention is to discover qualitative and quantitative, time-dependent and time-independent pattern in one framework by statistical analysis of data sets.

Further objects include the provisions of:

1. new algorithm of detecting different order patterns.
2. elimination of non-informative pattern candidates to avoid exhaustive search and to speed up the discovery process.

3. knowledge representation language which can encode both the qualitative and the quantitative pattern, is transparent to the user and is easy to be accessed by inferring engine.

4. incorporation of domain knowledge to the pattern discovery and inference process.

5. system which is capable of detecting both time-dependent and time-independent patterns.

6. inferring engine which can incorporate the information of both positive and negative patterns.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

4. SUMMARY OF THE INVENTION

The objects are accomplished in accordance with the present invention by the provision of a new pattern discovery system which consists of (a) an algorithm based on adjusted residual analysis which is capable of detecting different order patterns in the presence of noise. This algorithm can discover deterministic as well as probabilistic patterns from imperfect data sets; (b) heuristics based on the occurrence of negative patterns and asymptotic requirements which help eliminate non-informative candidates in the early stage to avoid exhaustive search which is common in existing systems, so as to speed up discovery process; (c) attributed hypergraph (AHG) based knowledge representation language which is general enough to encode information at many levels of abstraction yet simple enough to quantify the information content of its organized structure. It is a general case of all tree and network based representations. Since AHG representation is lucid and transparent for visualization, retrieval and interpretation of different order patterns can be easily achieved; (d) domain knowledge which is presented as selected attribute(s) or various combinations of attributes, When necessary, according to the a priori knowledge of certain application area, interested attributes or combination of attributes can be singled out as a guidance for pattern search, or eliminated to reduce search space. One can also invent new attributes from the data set for better interpretation of domain; (e) an mechanism to detect time-dependent pattern from sequential data set by attaching a time label to each entity in the data set. This mechanism enables the new system of detecting both time-dependent and time-independent patterns, so as to perform prediction and forecasting as well as classification, association, and clustering, which cannot be done by conventional approaches; (f) an inferring engine which uses weight of evidence in information theory to evaluate to what extent a pattern will contribute to a conclusion. This approach makes use of both positive and negative patterns, which are normally ignored by existing methods.

The present technique, with its generality, versatility, efficiency and flexibility, is well suited for automatic pattern discovery, data analysis, trend prediction and forecasting. Applications are evident in data mining, healthcare, stock market prediction, risk analysis, decision support, and economic analysis, as well as other other fields.

Feature features and advantages of the invention will become more readily apparent from the following detailed description when taken in conjunction with the accompanying drawings.

A method in a computer of pattern discovery in a data base, comprising the steps of:

a) operating a computer to provide a data base comprising M samples, each sample being described in terms of N attributes represented by $X=\{X_1, \ldots X_N\}$, each attribute $X_i$ comprising a random variable taking on values from its alphabet $\alpha_i = \{\alpha^i, \ldots \alpha^{min}\}$ where $m_i$ is the cardinality of an alphabet of the ith attribute, wherein a primary event is a realization $(x_i)$ of $X_i$ which takes on a value from $\alpha_i$;

b) operating the computer to set an initial pattern candidate set C comprising a plurality of candidates c and an Attributed Hypergraph (AHG) pattern set P (AHG P) to be empty, placing all primary events $r_i$ into a primary event set R, and setting order O=1;

c) operating the computer to increment O and generating a candidate set C of order O from previous and primary event set R and if C is empty, go to step (e); otherwise go to step (d);

d) operating said computer to count, for each candidate c in C, its occurrences o and to calculate its expected occurrence e given by $$e = M \cdot \prod_{i=1}^{o} o_i/M$$

where $o_i$ is the occurrence of the i-th primary event in c and M is the total number of instances in said database, if the expected occurrence is less than a preselected threshold, remove c from C, if the expected occurrence is greater than the preselected threshold, calculate an adjusted residual d of this candidate given by $$d = (o - e)/\sqrt{v}$$

where v is a maximum likelihood estimate of the variance of residual (o−e), if |d| is larger than a preselected confidence level, put c into AHG P, and if c is a negative pattern and the occurrence o is less than the preselected threshold, remove c from C, and if order O is equal to a highest order in demand, go to step (e) below, otherwise go to step (b); and e) operating the computer to output AHG P.

5. BRIEF DESCRIPTION OF THE DRAWINGS

FIG. 1 is a block diagram, in schematic form, of the skeleton of the invention.

6. DETAILED DESCRIPTION OF THE PREFERRED EMBODIMENTS

FIG. 1 shows the skeleton of the pattern discovery and inference system. In the first block, pattern discovery algorithm detects statistical significant patterns together with the parameters which describe the characteristics of the pattern, from a given data set. These detected patterns are then encoded in an AHG based representation. This representation will act as a knowledge base for the inference process. In the inference process, new objects are classified, various queries are answered, future occurrence/trends are predicted.

The following sections will describe the invention one part at a time in details.

6.1 Definitions and Notations

Consider that we have a data set D containing M samples. Every sample is described in terms of N attributes, each of which can assume values in a corresponding discrete finite alphabet. Let $X=\{X_1, \ldots, X_N\}$ represent this attribute set. Then each attribute, $X_i, 1 \leq i \leq N$, can be seen as a random variable taking on values from its alphabet $\alpha_i = \{a_i^1, \ldots, a_i^{m_i}\}$, where $m_i$ is the cardinality of the alphabet of the ith attribute. Thus, a realization of X can be denoted as $x_j = \{x_{1j}, \ldots, x_{Nj}\}$, where $x_{ij}$ can assume any value in $\alpha_i$. In this manner, each sample in the data set is a realization of X. If the order of the samples in D is important, any realization of an attribute will be associated with a position t, where $1 \leq t \leq M$. If not necessary, we ignore t to keep a simple notation. With the above notations, the following terms are defined.

Definition 1 A primary event of a random variable $X_i$ ($1 \leq i \leq N$) is a realization of $X_i$ which takes on a value from $\alpha_i$.

We denote the pth ($1 \leq p \leq m_i$) primary event of $X_i$ as $$[X_i = \alpha_i^p]$$

or simply $x_{ip}$. For data set D, there are $$v = \sum_{i=1}^{N} m_i \quad (1)$$

different primary events. We assume that two primary events, $x_{ip}$ and $x_{iq}$, of the same variable $X_i$ are mutually exclusive if $p \neq q$.

Let s be a subset of integers $\{1, \ldots, N\}$ containing k elements ($k \leq N$), and $X^s$ be a subset of X such that $$X^s = \{X_i | i \in S\}.$$

Then $x^s$ denotes the realization of $X^s$.

Definition 2 A compound event associated with the variable set $X^s$ is a set of primary events instantiated by a realization $x^s$. The order of the compound event is $|s|$.

The jth compound event associated with the variable set $X^s$ can be represented by $$x_j^s = \{X_i = \alpha_i^{p_j} | i \in s, p_j \in \{1, \ldots, m_i\}\}$$

where $p_j$ is a map of j to an ith alphabet.

A 1-compound event is a primary event. A k-compound event is made up of k primary events of k distinctive variables. Every sample in the data set is an N-compound event.

Definition 3 A sub-compound event of $x_j^s$ is a compound event $x_j^{s'} \forall s' \subset s$ and $s' \neq \phi$.

Definition 4 The expected occurrence of a compound event $x_j^s$ in data set D is its expected total under the assumption that the variables in $X^s$ are mutually independent. The expected occurrence of $x_j^s$ is denoted as $e_{x_j^s}$.

Definition 5 Let T be a statistical significance test. If the occurrence of a compound event $X_j^s$ is significantly different from its expectation, we say that the primary events of $x_j^s$ have a statistically significant association according to T or simply they are associated.

Definition 6 If a compound event $x_j^s$ passes the statistical significance test T, we say that $x_j^s$ is a significant pattern, or simply a pattern, of order $|s|$.

The advantages of defining patterns as statistical significant compound events are (a) patterns are described at the event level which is efficient and comprehensive than at the variable level, (b) it enables the system of detecting patterns in the presence of noise, and (c) it reflects the basic nature of patterns—event associations.

6.2 Attributed Hypergraph Representation

First, let us give a formal definition of hypergraph [1].

Definition 7 Let $Y = \{y_1, y_2, \ldots y_n\}$ be a finite set. A hypergraph on Y is a family $H = (E_1, E_2, \ldots E_m)$ of subsets of Y such that 1. $E_i \neq \phi$ (i=1, 2, ..., m)

2. $\bigcup_{i=1}^{m} E_i = Y.$

The elements $y_1, y_2, \ldots y_n$ of Y are called vertices, and the sets $E_1, E_2, \ldots, E_m$ are the edges of the hypergraph, or simply, hyperedges.

Definition 8 A simple hypergraph is a hypergraph H with hyperedges ($E_1, E_2, \ldots, E_m$) such that $$E_i = E_j \Rightarrow i = j.$$

Unless otherwise indicated, we refer hypergraph to simple hypergraph.

To describe patterns of various orders for a data set by an AHG, each vertex represents a primary event. Each pattern or statistically significant association among the primary events is represented by a hyperedge. A kth order pattern is a hyperedge containing k primary events. The following list gives some hypergraph terminologies and their corresponding meanings in pattern representation:

Each vertex of a hypergraph is a primary event of a data set;

Each hyperedge represents a pattern (significant event association) in the data set;

The order of a hypergraph is the number of primary events appearing in the data set;

The rank of a hypergraph is the highest order of the patterns detected from the data set; similarly, the anti-rank is the lowest order of detected patterns;

For a primary event $x_{ij}$, the star $H(x_{ij})$ of hypergraph H with center $x_{ij}$ represents all the patterns related to the primary event $x_{ij}$.

Let A be a subset of all primary events, the sub-hypergraph of hypergraph H induced by A represents the associations among the primary events in A.

In AHG representation, both the vertices and the hyperedges of the hypergraph are attributed. In our case, the attribute of each vertex is the number of observations of the corresponding primary event $x_{ip}$, denoted by $o_{x_{ip}}$, or simply $o_{ip}$. If the data set is sequential, the position t of the primary event is also one of the attribute. The attributes of each hyperedge are: 1) the number of observations of the corresponding compound event $x_j^s$, denoted by $o_{x_j^s}$; 2) the number of expected observations of the event, denoted by $e_{x_j^s}$; 3) the significance threshold $\tau_{x_j^s}$ used by the significance testing T; and 4) the occurrences of $(|s|-1)$th order sub-compound events of $x_j^s$. All of them will be useful for the inference process. It should be noted that the selection of attribute is domain dependent. One can select other descriptions of the hypergraph for a better interpretation of their problem domain. Hyperedges depict the qualitative relations among their elementary vertices (primary events), while the attributes associated with the hyperedges and the vertices quantify these relations.

The advantage of using attributed hypergraph as pattern representation language is obvious. Hypergraph is the general form of graphs, trees and networks. Different from graphs, trees and networks, hypergraph can distinguish between set connectivity and connectivity among their elements. Hence, it is ideal for representing different order patterns.

Compared to production (if-then) rules, hypergraph based representation is more flexible. Each rule has a left-hand antecedent involving one or more attribute and a right-hand consequent normally regarding to only one attribute. In a general case, however, with changing interest, values of different attributes are to be predicted. To be able to predict the values of many attributes, or achieve flexible prediction a huge number of rules have to be generated. This is sometimes impractical in the real world. On the contrary, hypergraph based representation can easily re-organize the represented knowledge according to changing environment.

Compared to relational representations such as Horn clause and First Order Logic, AHG based representation is more suitable for numerical inference. Since logic representations are originally designed to formalize mathematical reasoning, patterns in these representations are deterministic rather than probabilistic. To do probabilistic reasoning, adoptions have to be done to cope with numerical variables as well as probabilistic patterns. This problem also exists in structured representations such as semantic networks. Besides, logic based representations are considered less comprehensible and harder to visualize than other graph based representations. By adding attributes to hypergraphs, probabilistic properties of patterns are easily encoded. Numerical reasoning is as easy as logic reasoning.

Attributed hypergraph representation proposed here overcomes the shortcomings of the traditional representation. AHG is a direct, simple and efficient representation for describing the information at different and/or mixed levels of abstraction. In AHG, both the qualitative relations (the structure of the hypergraph) and the quantitative relations (the quantitative attribute values of the vertices and the hyperedges) are encoded. Since AHG representation is lucid and transparent for visualization, retrieval and interpretation of different order patterns can be easily achieved. A good number of mature algorithms can be adopted for the implementation of various operations, which help retrieve and/or re-organize the patterns encoded in an AHG.

6.3 Statistical Significant Test by Adjusted Residual

Considering a k-compound event $x_j^s$, we would like to determine whether or not $x_j^s$ is a pattern by testing if the probability, $Pr(x_j^s)$ is significantly different from the probability of $x_j^s$ under the assumption that all the variables (attributes) in $X^s$ are independent. If it is true, the compound event $x_j^s$ is then a pattern which indicates that the primary events involved are likely (or unlikely) to occur together. A hyperedge will be generated to enclose the primary events (vertices) of $x_j^s$ as a statistically significant association.

Let us denote the observed occurrences of compound event $x_j^s$ as $o_{x_j^s}$ and its expected occurrences as $e_{x_j^s}$.

Testing whether or not $Pr(x_j^s)$ is significantly different from $$\prod_{x_{ip} \in x_j^s} Pr(X_i = \alpha_i^p)$$

can be performed by testing the significance of model departure measured by residual $$Y_{x_j^s} = o_{x_j^s} - e_{x_j^s} \qquad (2)$$

According to [18], however, $Y_{x_j^s}$, cannot be employed for evaluating the relative size of the discrepancy between $o_{x_j^s}$ and $e_{x_j^s}$ because the absolute difference may be affected by the marginal totals. To solve this problem, standardized residual defined in [8] is used to scale this difference as below:

$$z_{x_j^s} = \frac{o_{x_j^s} - e_{x_j^s}}{\sqrt{e_{x_j^s}}} . \qquad (3)$$

The standardized residuals have the property that it has an asymptotic normal distribution with a mean of approximately zero and a variance less than one. That is:

$$z_{x_j^s} \xrightarrow{D} N(0, v_{x_j^s})$$

where $v_{x_j^s}$ is the variance of $z_{x_j^s}$, and $v_{x_j^s} \leq 1$.

Standardized residual is considered to be of normal distribution only when the asymptotic variance v is close to 1, otherwise, standardized residual has to be adjusted by its variance for a more precise analysis. The adjusted residual can be expressed as:

$$d_{x_j^s} = \frac{r_{x_j^s}}{\sqrt{c_{x_j^s}}} \qquad (4)$$

where $c_{x_j^s}$ is the variance of $Y_{x_j^s}$. Hence, $$d_{x_j^s} \xrightarrow{D} N(0, 1)$$

In practice, to calculate adjusted residual, the maximum likelihood estimate of $c_{x_j^s}$ has to be first obtained. If N is fixed in data set D, under the independent assumption, the occurrence of a compound event belongs to a multinomial model. To calculate the expected occurrence of $x_j^s$, we have $$e_{x_j^s} = M \cdot \prod_{x_{ip} \in x_j^s} Pr(X_i = \alpha_i^p) \qquad (5)$$

where M is the sample size and the maximum likelihood estimate of the probability is given by $$Pr(X_i = \alpha_i^p) = o_{x_{ip}} / M. \qquad (6)$$

Since we are testing the significance of departure from independence, we can assume the testing model is a hierarchical model without two or higher order interactivity. This assumption is equivalent to that of which all involved variables are mutually independent. For this kind of hierarchical model, the maximum likelihood estimate of the residual variance always has an explicit solution in the form of:

$$\hat{c} = \hat{e} \left\{ 1 - \hat{e} \sum_{\alpha=1}^{b} [1/n^{T(\alpha)}] + \hat{e} \sum_{\alpha=2}^{b} [1/n^{V(\alpha)}] \right\} \qquad (7)$$

where $\hat{e}$ is the estimate of expected occurrence (Eqn. 5), $n^{T(\alpha)}$ is marginal total of a single variable involved, and $n^{V(\alpha)}$ is marginal total of more than one variable.

By Eqn. 5 and Eqn. 7, adjusted residual of a compound event can be calculated. Since adjusted residual follows normal distribution N(0,1), we can easily identify whether a compound event is significant deviated from the independent model. With a given confidence level, 95% for example, if the absolute value of the residual $d_{x_j^s}$ is greater than the predefined significant level, 1.96 for 95%), then $x_j^s$ is considered as a pattern. If the true value of $d_{x_j^s}$ exceeds the level, we conclude that the primary events of $x_j^s$ are "associated" and likely to occur together, with a confidence level of 95%. In this case, $x_j^s$ is referred to as a positive pattern.

If $z_{x_j^s}$ is less than −1.96, we conclude that the primary events are unlikely to co-occur. It is referred to as a negative pattern. This testing can be formalized as:

1. $H_o$: $x_j^s$ is random; $H_1$: $x_j^s$ is significant;
2. The decision rule has the following form: $(|d_{x_j^s}|>\text{threshold}) \Rightarrow H_1$ The sign of $d_{x_j^s}$ determines whether $x_j^s$ is a positive or a negative significant compound event.

Residual analysis in statistics has long been used to test the goodness of fit of data and model. Statisticians try to find a good model to describe the data. But in practice, data are so complicated that a good model may not be found. In this invention, we modify this technique and apply it to detect the significant patterns, not a model for the whole data. To the extend of our knowledge, such technique has not been seen in the application of pattern discovery.

6.4 Technique for Eliminating Non-Informative Candidates

Exhaustive search which is used by many existing approaches may behave well at lower orders or in small problem domains, but not practical when applied to large databases. Therefore, it is crucial that exhaustive search is avoided in real-world applications. Heuristics are introduced here to eliminate statistically insignificant pattern candidates (compound events) as early as possible in the pattern discovery process.

There are essentially two criteria for eliminating impossible pattern candidates. One is for the validation of the significance test and the other is for test of higher order negative patterns.

6.4.1 Validation of the Significance Test

Those events to which statistical testing is no longer valid for higher order patterns cannot be possibly included in the formalization of higher order patterns. Hence, a compound event will not be considered if there are enough evidences indicating that it is either statistically untestable or impossible to be significant.

For a valid statistical significance test of a compound event, the expected occurrence of this event is required to be at least 3 based on the common practice in hypothesis testing for contingency table. That is to say, only when $$e_{x_j^s} \geq \omega_e \qquad (8)$$

where $\omega_e \geq 3$, the test is valid. For a test of a particular cell in a contingency table, this requirement might be even stricter—$\omega_e$ can be selected as greater than 5.

If the expected occurrence of a compound event $x_j^s$ is $e_{x_j^s}$, the expected occurrences of any higher order compound event $x_i^r$ such that $x_i^r \supset x_j^s$ cannot be greater than $e_{x_j^s}$. Thus, when the expected occurrence of a compound event $x_j^s$ is less than $\omega_e$, those higher order compound events which have $x_j^s$ as one of their sub-compound events are all statistically untestable, and therefore eliminated from further consideration.

6.4.2 Negative Patterns

When determining whether or not a compound event $x_j^s$ is a possible component of a higher order pattern, we should realize that there are some differences in handling negatively significant and positively significant associations. If $x_j^s$ is a negative pattern, whether or not a higher order compound event $x_i^r$ ($x_i^r \supset x_j^s$) should be tested is decided by the occurrence of $x_j^s$.

A negative pattern means that the primary events in this pattern are not likely to occur together. If primary events $x_{ip1}$ and $x_{jp2}$ never occur together (the occurrence of compound event $[x_{ip}, x_{jp2}]$ is zero) in data set D, the primary events of any compound events containing $x_{ip1}$ and $X_{jp2}$ will not occur together either. In the inference process, if we observe anyone of $x_{ip1}$ and $x_{jp2}$, no more higher order evidence will be necessary to draw the conclusion that the other event will not happen together.

In a general case, especially in the presence of noise, the occurrence of a negative pattern may not be zero. To determine whether or not higher order compound events $x_i^r$ containing negative pattern $x_j^s$ should be tested, the occurrence of $x_j^s$, $o_{x_j^s}$, should be investigated. Given $e_{x_i^r}$, to test whether or not adjusted residual $d_{x_i^r}$ is greater (or less) than a threshold is equivalent to testing whether or not $o_{x_i^r}$ is greater (or less) than a correspondent threshold. Defined as the requirement of $o_{x_i^r \text{ for } x_i^r}$ to be significant, $ô_{x_i^r}$ is calculated by $$ô_{x_i^r} = e_{x_i^r} + \text{threshold} \cdot \sqrt{c_{x_i^r}} \ ; \qquad (9)$$

where, $c_{x_i^r}$ is calculated by Eqn. 7 and threshold is a constant according to a fixed confidence level.

Let $x_j^s$ a pth order negatively significant pattern whose occurrence is $o_{x_j^s}$. Of all the qth order compound events (q>p) which contain $x_j^s$ as a sub-compound event, $x_i^r$ has the minimum expectation. If $o_{x_j^s}$ is less than $ô_{x_i^r}$, then it is not necessary to test those compound events whose orders are between p and q. If q is the highest order for the data set, all of the compound events containing $x_j^s$ will be eliminated from consideration.

When $o_{x_j^s}$ is very small comparing with $e_{x_j^s}$, it provides very strong evidence that the primary events in $x_j^s$ are not likely to co-occur. An extreme case happens when $o_{x_j^s}$ is zero. In this case, the occurrence of any higher order compound event $x_i^r$ which contains $x_j^s$ is also zero, since $$0 \leq o_{x_i^r} \leq o_{x_j^s}, \ x_i^r \supset x_j^s. \qquad (10)$$

That is to say, if we are sure (with high confidence level) that a pattern $x_j^s$ is negative, all compound events containing $x_j^s$ cannot be positive patterns. From the view point of inference, higher order negative pattern $x_i^r$ provides no more information than $x_j^s$ itself. The discovery of negatively significant pattern $x_j^s$ makes the detection of its associated higher order patterns unnecessary. Hence, none of the compound events containing $x_j^s$ will be examined.

If $x_j^s$ is positively significant, situations can be more complicated since the higher order compound events containing $x_j^s$ may be positively significant, negatively significant, or insignificant. It is difficult to decide whether or not higher order events should be eliminated according to the occurrence of $x_j^s$. In this case, only the requirement of expected occurrence applies.

6.5 Pattern Discovery Algorithm

The pattern discovery process can be described by the following steps:

1. Set the initial candidate set C and pattern set P (AHG) to be empty, put all primary events into R, set order O=1;
2. Increment O and generate candidate set C of order O from previous C and primary event set R (C←GenCandidate(C, R));

3. If C is empty, go to Step 6;

4. For each candidate c in C, count its occurrences o and calculate its expected occurrence e. If the expected occurrence is less than a pre-define threshold, remove c from C.
   Otherwise, calculate the adjusted residual d of this candidate. If |d| is larger than a confidence level, put c to AHG P. If c is a negative pattern and the occurrence o is less than a pre-defined threshold, also remove c from C;

5. If order O is equal to the highest order in demand, go to Step 6, otherwise, go to Step 2;

6. Output AHG P (all patterns found).

Detecting time-independent patterns and time-dependent patterns shares the same process stated above. The only different is the way of generating pattern candidates. When detecting time-independent patterns, time span is not considered. The process of generating time-independent pattern candidates can be depicted as the following steps:

1. If C is empty and O is not 2, go to Step 5;
2. If C is empty and O is equal to 2, for any two primary events $Y_1$ and $Y_2$ in R, such that $Y_1$ and $Y_2$ belong to two different variables, construct a compound event c. Add c into C;
3. If C is not empty, let C' be an empty set. For any c in C, select a primary event Y from R, such that Y is not a sub-compound event of c. Construct new compound event c'=c+Y. If c' has not been in C', put c' into C'. Delete c from C;
4. When finished Step 3, rename C' to C;
5. Return C.

For time-dependent pattern detection, we have to consider the time span which interests us. Suppose we are interested in a time span from 0 to T, the process of generating time-dependent pattern candidates is performed as:

1. If C is empty and O is not 2, go to Step 5;
2. If C is empty and O is equal to 2, for any two primary events $Y_1$ and $Y_2$ in R, construct compound events $[Y_{1t_1}, Y_{2t_2}]$, where $t_1, t_2 \in [0,T]$. Add them to C;
3. If C is not empty, let C' be an empty set. For any c in C, select a primary event Y from R. Construct compound event $c'_t = c + Y_t$, where $t \in [0, T]$ and $Y_t$ not in c. If $c'_t$ ($0 \leq t \leq T$) has not been in C', put $c'_t$ into C'. Delete c from C;
4. When finished Step 3, rename C' to C;
5. Return C.

By doing this, we combine the process of detecting time-independent patterns with the process of detecting time-dependent patterns. Domain knowledge can be easily incorporated into the pattern discovery process by making constraints on the selection of primary event and on the combination of compound event. For example, if we are going to classify a set of objects, only those patterns related to the class information are interested. We can oidy detect those patterns containing class information. If domain knowledge says that primary event $Y_1$ and $Y_2$ will never happen together, we just add this pattern to the AHG and will not generate pattern candidates containing these two events. In the case of time-dependent pattern discovery, if domain knowledge tells us that only a fixed delay of time t is interesting, we then will not try to detect patterns containing time delay other than t. By imposing such kind of constraints, we can save time for the whole process.

6.6 Inference with Weight of Evidence

The inference of a intelligent system performs three tasks, association, classification and prediction.

To extract associations from an AHG is very straightforward, since every hyperedge in an AHG represents an association among certain number of primary events. If the association is related to a certain attribute, a certain primary event or a set of attributes/events, are interesting, all the hyperedges containing such attribute(s) and/or event(s) are directly extracted from the AHG without any calculation.

With respect to classification and prediction, they can be formulated into one problem. In classification, given a new object, we want to find to which class it belongs, that is, to find the value of the class attribute. In prediction, we have a sequence of objects, the task is to find the value of the next object. Thus, both problems can be seen as to find the missing value of a certain attribute, according to the patterns we have already found.

Suppose that a pattern $x_j^s$ is associated with the attribute $X_i$ whose value is missing. Since $\{x_j^s \backslash x_{ij}^s\}$ is a subset of $\{x_i \backslash ?\}$, it provides some evidence supporting $X_i$ taking on the value of $x_{ij}^s$. Based on mutual information, the weight of evidence provided by $x_j^s$ in favor of $x_{ij}^s$ being a plausible value of $X_i$ as opposed to other values is denoted by $W(x_{ij}^s / \neg x_{ij}^s | x_j^s \backslash x_{ij}^s)$, and defined as follows:

$$W(x_{ij}^s/\neg x_{ij}^s|x^s\backslash x_{ij}^s) = \qquad (11)$$

$$I(x_{ij}^s : x_j^s\backslash x_{ij}^s) - I(\neg x_{ij}^s : x_j^s\backslash x_{ij}^s) =$$

$$\log \frac{Prob(x_{ij}^s|x^s\backslash x_{ij}^s)}{Prob(x_{ij}^s)} - \log \frac{Prob(\neg x_{ij}^s|x^s\backslash x_{ij}^s)}{Prob(\neg x_{ij}^s)}.$$

It may be interpreted as a measure of the difference in the gain of information when $X_i$ takes the value $x_{ij}^s$ and when it takes some other values, given $x_j^s$. $W(x_{ij}^s / \neg x_{ij}^s | x_j^s \backslash x_{ij}^s)$ is positive if $x_j^s$ provides positive evidence supporting $x_{ij}^s$ being a plausible value of $X_i$, otherwise, it is negative.

Using Bayes formula, we can rewrite Eqn. 11, equivalently, as:

$$W(x_{ij}^s/\neg x_{ij}^s|x^s\backslash x_{ij}^s) \qquad (12)$$

$$= \log \frac{Prob(x_j^s\backslash x_{ij}^s|x_{ij}^s)}{Prob(x_j^s\backslash x_{ij}^s)} - \log \frac{Prob(x_j^s\backslash x_{ij}^s|\neg x_{ij}^s)}{Prob(x_j^s\backslash x_{ij}^s)}$$

$$= \log \frac{Prob(x_j^s\backslash x_{ij}^s|x_{ij}^s)}{Prob(x_j^s\backslash x_{ij}^s|\neg x_{ij}^s)}$$

$$= \log \frac{Prob(x_j^s) \cdot (1 - Prob(x_{ij}^s))}{Prob(x_{ij}^s) \cdot (Prob(x_j^s\backslash x_{ij}^s) - Prob(x_j^s))} \qquad (13)$$

In a similar manner, the weights of evidence that are provided by other relevant values of the inference process regarding the predicting attribute can be computed. It must be noted that a negative weight of evidence implies that there is negative evidence against the attribute taking certain value. In other words, it is more likely for this attribute to take another value.

Suppose that the value of an attribute $X_i$, is missing. It is quite possible that there is more than one statistically significant pattern which is associated with one of $X_i$'s possible values. Some of them may provide evidences supporting $X_i$ to take a certain value whereas others may provide evidences against it. For an inference process, there is a need for an uncertainty measure to quantitatively combine and compare the positive and negative evidences provided by the observations.

Osteyee's uncertainty measure—the weight of evidence, which is originally defined for applications involving two variables [15] is extended in this invention. A more general weight of evidence measure for high-order reasoning is proposed. It measures the evidence provided by related patterns $x_1^{s^1}, \ldots, x_n^{s^n}$ in favor of $X_i$ taking the value of $x_{ij}$ as as opposed to other values. The definition is:

$$W(x_{ij}/\neg x_{ij}|x_1^{s_1}, \ldots, x_n^{s_n}) = \log \frac{O(x_{ij}/\neg x_{ij}|x_1^{s_1}, \ldots, x_n^{s_n})}{O(x_{ij}/\neg x_{ij})}, \quad (14)$$

where $O(x_{ij}/\neg x_{ij}|x_1^{2^1}, \ldots, x_n^{s^n})$ is the odds in favor of $X_i$ taking the value of $x_{ij}$ as opposed to other values, and defined as:

$$O(x_{ij}/\neg x_{ij}|x_1^{s_1}, \ldots, x_n^{s_n}) = \frac{Prob(x_{ij}|x_1^{s_1}, \ldots, x_n^{s_n})}{Prob(\neg x_{ij}|x_1^{s_1}, \ldots, x_n^{s_n})}, \quad (15)$$

and $O(x_{ij}/\neg x_{ij})$ is the odds in favor of $X_i$ taking the value of $z_{ij}$ as opposed to other values, which is defined as:

$$O(x_{ij}/\neg x_{ij}) = \frac{Prob(x_{ij})}{Prob(\neg x_{ij})}. \quad (16)$$

The weight of evidence W can therefore be rewritten as:

$$W(x_{ij}/\neg x_{ij}|x_1^{s_1}, \ldots, x_n^{s_n}) = \quad (17)$$

$$\log \frac{Prob(x_{ij}|x_1^{s_1}, \ldots, x_n^{s_n})}{Prob(x_{ij})} - \log \frac{Prob(\neg x_{ij}|x_1^{s_1}, \ldots, x_n^{s_n})}{Prob(\neg x_{ij})},$$

or equivalently:

$$W(x_{ij}/\neg x_{ij}|x_1^{s_1}, \ldots, x_n^{s_n}) = \quad (18)$$

$$\log \frac{Prob(x_1^{s_1}, \ldots, x_n^{s_n}|x_{ij})}{Prob(x_1^{s_1}, \ldots, x_n^{s_n})} - \log \frac{Prob(x_1^{s_1}, \ldots, x_n^{s_n}|\neg x_{ij})}{Prob(x_1^{s_1}, \ldots, x_n^{s_n})} =$$

$$\log \frac{Prob(x_1^{s_1}, \ldots, x_n^{s_n}|x_{ij})}{Prob(x_1^{s_1}, \ldots, x_n^{s_n}|\neg x_{ij})}.$$

If two patterns have no intersection, we can assume that they are conditionally independent. If $x_1^{s^1}, \ldots, x_n^{s^n}$ are n disjoint patterns, the weight of evidence is extended to higher orders and can be expressed as:

$$W(x_{ij}/\neg x_{ij}|x_1^{s_1}, \ldots, x_n^{s_n}) = \quad (19)$$

$$\log \frac{Prob(x_1^{s_1}|x_{ij})}{Prob(x_1^{s_1}|\neg x_{ij})} + \ldots + \log \frac{Prob(x_n^{s_n}|x_{ij})}{Prob(x_n^{s_n}|\neg x_{ij})} =$$

$$W(x_{ij} \neq x_{ij}|x_1^{s_1}) + \ldots + W(x_{ij}/\neg x_{ij}|x_n^{s_n}) =$$

$$\sum_{p=1}^{n} W(x_{ij}/\neg x_{ij}|x_p^{s_p}).$$

where $x_p^{s^p}$ and $x_q^{s^q}$ satisfy $$x_p^{s^p} \cap x_q^{s^q} = \phi, \text{ if } p \neq q, 1 \leq p, q \leq n.$$

Implictly, it is always assumed that each attribute is of the same importance in characterizing the system. There is no a priori knowledge concerning the interrelation of the attributes in the observed events. If such domain knowledge is available, we can always take into account in the process of calculating the weight of evidence. Higher order statistically significant compound events describe the system's behavior more accurate than lower order events. When calculating the weight of evidence for or against an attribute taking certain value, the highest order compound event should be considered first. The total weight of evidence in support of a certain value given a set of patterns is the maximum sum of individual weight of evidence of non-intersected patterns.

The inference (reasoning) process based on weight of evidence can be summarized as the following steps:

1. Identify the variable X of whose value is going to be predicted;
2. Search AHG for all patterns related to variable X and all available information, such as other attribute values of the same object, or previous occurrence and history of the series, put such patterns into P;
3. If P is empty, set result S to unknown, go to Step 6;
4. For each possible value $x_i$ of X, extract from P pattern set $P_i$ in which all patterns are related to the value $x_i$, calculate the weight of evidence $\omega_i$ in support of $x_i$ given $P_i$, if $P_i$ is empty, skip $x_i$;
5. Of all weights of evidence. select the maximum one, say $\omega_k$, then value $x_k$ will be the most plausible value, set S to $x_k$; if two or more weights of evidence are equal, choose one value $x_k$ from them with the maximum probability, set S to $x_k$;
6. Output S.

The advantage of using weight of evidence as a measure is that negative information can also be considered in the inference process. Since we cannot assume that a data set is complete, negative information is important for correct inference. Most existing methods fail to do this. Another advantage of weight of evidence is its addability. If we observe one than one pattern regarding the same value and they are mutually exclusive, the contribution of each pattern to the value can be summed up. This unified measure is theoretically well defined.

References

[1] C. Berge, *Hypergraph: Combinatorics of Finite Sets*, North Holland, 1989.

[2] K. C. C. Chan, *Induction Learning in the Presence of Uncertainty*, Ph.D. dissertation, Department of Systems Design Engineering, University of Waterloo, 1989.

[3] K. C. C. Chan and A. K. C. Wong, "APACS: A System for Automated Pattern Analysis and Classification", *Computational Intelligence*, Vol. 6, No. 3, pp. 119–131, 1990.

[4] D. H. Fisher, "A Hierarchical Conceptual Clustering Algorithm", Technical Report, Department of Information and Computer Science, University of California, Irvine, 1984.

[5] D. H. Fisher, "Knowledge Acquisition Via Incremental Conceptual Clustering", *Machine Learning*, Vol. 2, No. 2, pp. 139–172, 1987.

[6] D. H. Fisher, "Concept Clustering, Learning from Examples, and Inference", *Proceedings of the 4th International Workshop on Machine Learning*, pp. 38–49, 1987.

[7] D. H. Fisher and K. B. McKusick, "An Empirical Comparison of ID3 and Back-propagation", *Proceedings of the 11th International Joint Conference on Artificial Intelligence*, Vol.1, 1989.

[8] S. J. Haberman, "The Analysis of Residuals in Cross-Classified Tables", *Biometrics*, 29, pp. 205–220, 1973.

[9] S. J. Haberman, *The Analysis of Frequency Data*, University of Chicago Press, 1974.

[10] M. Holsheimer and A. Siebes, *Data Mining: the Search for Knowledge in Databases,* Technical Report, CS-R9406, CWI, Amsterdam, 1994.

[11] P. Langley and J. G. Carbolnell, "Approaches to Machine Learning", *Journal of the American Society for Information Science,* Vol. 35, No. 5, pp. 306–316, 1984.

[12] P. Langley and S. Sage, "Conceptual Clustering as Discrimination Learning", *Proceedings of the Fifth Biennial Conference of the Canadian Society for Computational Studies of Intelligence,* 1984.

[13] R. Michalski and R. Chilauski, "Knowledge Acquisition by Encoding Expert Rules versus Computer Induction from Examples: A Case Study Involving Soybean Pathology", *International Journal of Man-Machine Studies,* Vol. 12, pp. 63–87, 1980.

[14] R. Michalski and P. Stepp, "Automated Construction of Classifications: Conceptual Clustering Versus Numerical Taxonomy", *IEEE Transactions on Pattern Analysis and Machine Intelligence,* Vol. 5, No. 4, pp. 396–409, 1983.

[15] D. B. Osteyee and I. J. Good, *Information, Weight of Evidence, the Singularity between Probability Measures and Signal Detection,* Springer-Verlag, Berlin, 1974.

[16] J. R. Quinlan, "Induction of Decision Trees", *Machine Learning,* No. 1, pp.81–106, 1986.

[17] P. Smyth, and R. M. Goodman, "Information Theoretic Approach to Rule Induction from Databases", *IEEE Transactions on Knowledge and Data Engineering,* Vol. 4, No. 4, pp. 301–316, 1992.

[18] N. Wrigley, *Categorical Data Analysis for Geographers and Environmental Scientists,* Longman, 1985.

Therefore what is claimed is:

1. A method in a computer of pattern discovery in a data base, comprising the steps of:

a) operating a computer to provide a data base comprising M samples, each sample being described in terms of N attributes represented by $X=\{X_1, \ldots Z_N\}$, each attribute $X_i$ comprising a random variable taking on values from its alphabet $\alpha_i=\{\alpha^i, \ldots, \alpha^{min}\}$ where $m_i$ is the cardinality of an alphabet of the ith attribute, wherein a primary event is a realization $(x_i)$ of $X_i$ which takes on a value from $\alpha_i$;

b) operating said computer to set an initial pattern candidate set C comprising a plurality of candidates c and an Attributed Hypergraph (AHG) pattern set P (AHG P) to be empty, placing all primary events $r_i$ into a primary event set R, and setting order O=1;

c) operating said computer to increment O and generating a candidate set C of order O from previous and primary event set R and if C is empty, go to step (e); otherwise go to step (d);

(d) operating said computer to count, for each candidate c in C, its occurrences o and to calculate its expected occurrence e given by $$[e = M \sqcap o_i/M]$$

$$e = M \cdot \prod_{i=1}^{o} o_i/M$$

where $o_i$ is the occurrence of the i-th primary event in c and M is the total number of instances in said database, if said expected occurrence is less than a preselected threshold, remove c from C, if the expected occurrence is greater than said preselected threshold, calculate an adjusted residual d of this candidate given by $$[d=(o-e)/\sqrt{V}]$$

$$d = (o-e)/\sqrt{v}$$

where v is a maximum likelihood estimate of the variance of residual (o–e), if $|d|$ is larger than a preselected confidence level, put c into AHG P, and if c is a negative pattern and the occurrence o is less than said preselected threshold, remove c from C, and if order O is equal to a highest order in demand, go to step (e) below, otherwise go to step (b);

(e) operating said computer to output AHG P.

2. The method according to claim 1 including subjecting the output AHG P to an inference process comprising the steps of:

(a) operating said computer to identify the variable X of whose value is to be predicted;

(b) operating said computer to search AHG P for patterns related to variable X and available information including but not limited to other attribute values of the same object, previous occurrence and history of the series, place such patterns into P, if P is empty, set result S to unknown and proceed to step (e) below;

c) for each possible realization $x_i$ of X, operating said computer to extract from P a pattern set $P_i$ in which all patterns are related to the value x, calculate a weight of evidence $w_i$ in support of $x_i$ against other values given $P_i$, $$[w_i = max(\Sigma W(x_i/\neg x_i|p_k))]$$

$$w_i = \max_j \left( \sum_{k=1}^{n_j} W(x_i/\neg x_i|p_k) \right)$$

where $n_j$ is the number of disjoint patterns in the j-th combination of $_jP$, and $W_j(x/\neg x_i|p_k)$ is the weight of evidence in support of $x_i$ against other values given pattern $P_k$ in the combination where $W(x_i/\neg x_i|p_k)=\text{Log } (\text{Prob}(p_k)(1-\text{Prob}(x_i))/(\text{Prob}(x_i)(\text{Prob}(p_k\backslash x_i)-\text{Prob}(p_k)))$ where Prob ( ) is the probability, if $P_i$ is empty then skip $x_i$;

d) operating said computer to select a maximum weight of evidence, $W_L$, so that $x_L$ is the most plausible value, set S equal to $x_L$; and e) operating said computer to output S.

3. The method according to claim 1 wherein the step of generating a candidate set C of order O includes generating a time-dependent candidate set C of order O comprising:

(a) operating said computer to determine if the condition C is empty and O is not 2 is satisfied, and if so go to step (b) below, otherwise go to step (e) below;

(b) operating said computer to determine if the condition C is empty and O is equal to 2 is satisfied, and if it is, for any two primary events r1 and r2 in R, such that r1 and r2 belong to two different variables, construct a compound event c, add c into C;

(c) if C is not empty, let C' be an empty set, for any c in C, select a primary event r from R such that r is not a sub-compound event of c, construct a new compound event c'=c+r, if c' has not been in C', put c' into C', delete c from C;

(d) when step (c) is complete, rename C' to C;

(e) return C.

4. The method according to claim 1 wherein said data base is a sequential database, the step of generating a candidate set C of order O includes generating a time-dependent candidate set C of order O comprising;

(a) operating said computer to determine if the condition C is empty and O is not 2 is satisfied, and if so go to step (b) below, otherwise go to step (e) below;

(b) operating said computer to determine if the condition C is empty and O is equal to 2 is satisfied, and if it is, for any two primary events $r_1$ and $r_2$ in R, construct compound events, where $t_1, t_2 \in$, add said compound events to C;

(c) if C is not empty, let C' be an empty set, for any c in C, select a primary event r from R, construct a new compound event $c'_t = c + r_t$, where $t \in$, if $c'_t$ ($O \leq t \leq T$) has not been in C', put $c'_t$ into C', delete c from C;

(d) when step (c) is complete, rename C' to C;

(e) return C.

\* \* \* \* \*

UNITED STATES PATENT AND TRADEMARK OFFICE
CERTIFICATE OF CORRECTION

PATENT NO. : 5,809,499
DATED : 09/15/98
INVENTOR(S) : Wong et al.

It is certified that error appears in the above-indentified patent and that said Letters Patent is hereby corrected as shown below:

Claim 1, line 5, delete "$Z_N$" and insert --$X_N$--;

Claim 1, line 7, delete "$\alpha^{min}$" and insert --$\alpha^{m_j}$--;
the symbol "$j$" is a subscript of the symbol "$m$"

Claim 4, line 11, after the term "compound events", insert --$[r_{1t1}, r_{2t2}]$--;

Claim 4, line 11, after the symbol "$\epsilon$", insert --$[0, T]$--;

Claim 4, line 15, after the symbol "$\epsilon$", insert --$[0, T]$--;

Claim 4, line 15, delete the letter "O" in "(O≤t≤T)" and insert the number --0--;

Signed and Sealed this

Ninth Day of November, 1999

Q. TODD DICKINSON

*Attest:*

*Attesting Officer*    Acting Commissioner of Patents and Trademarks